(12) United States Patent
Reidel et al.

(10) Patent No.: US 8,566,527 B2
(45) Date of Patent: Oct. 22, 2013

(54) SYSTEM AND METHOD FOR USAGE ANALYZER OF SUBSCRIBER ACCESS TO COMMUNICATIONS NETWORK

(75) Inventors: Timothy James Reidel, Kanata (CA); Li Zou, Nepean (CA)

(73) Assignee: Bridgewater Systems Corp., Ottawa (CA)

( * ) Notice: Subject to any disclaimer, the term of this patent is extended or adjusted under 35 U.S.C. 154(b) by 1065 days.

(21) Appl. No.: 12/177,341

(22) Filed: Jul. 22, 2008

(65) Prior Publication Data

US 2010/0023699 A1    Jan. 28, 2010

(51) Int. Cl.
*G06F 12/06* (2006.01)

(52) U.S. Cl.
USPC .......................................... 711/134; 711/170

(58) Field of Classification Search
USPC .................................................. 711/134, 170
See application file for complete search history.

(56) References Cited

U.S. PATENT DOCUMENTS

| 6,396,913 | B1 * | 5/2002 | Perkins, III | 379/112.01 |
| 6,766,413 | B2 * | 7/2004 | Newman | 711/113 |
| 7,366,495 | B1 * | 4/2008 | Magnotta et al. | 455/406 |
| 2001/0047394 | A1 * | 11/2001 | Kloba et al. | 709/217 |

\* cited by examiner

*Primary Examiner* — Kenneth Lo
(74) *Attorney, Agent, or Firm* — Zilka-Kotab, PC

(57) ABSTRACT

A system and a method are described, whereby a data cache enables the realization of an efficient design of a usage analyzer for monitoring subscriber access to a communications network. By exploiting the speed advantages of cache memory, as well as adopting innovative data loading and retrieval choices, significant performance improvements in the time required to access the necessary data records can be realized.

14 Claims, 10 Drawing Sheets

SYSTEM AND METHOD FOR USAGE ANALYZER OF SUBSCRIBER ACCESS TO COMMUNICATIONS NETWORK

BACKGROUND OF THE INVENTION

1. Field of the Invention

The present invention relates to a method and apparatus for usage management, and more specifically to the efficient management of subscriber usage of communications network resources.

2. Background Art

An increasingly large number of individuals use portable computing devices, such as laptop computers, personal data assistants (PDAs), smart phones and the like, to support mobile communications. The number of computing devices, and the number of networks that these devices connect to, has increased dramatically in recent years. Similarly, an increasing number of wireless Internet access services have been appearing in airports, cafes and book stores.

Typically users gain access to these networks by purchasing a subscription plan from a service provider. One type of subscription plan is a flat rate subscription plan. In a flat rate subscription plan a subscriber pays a fee for a billing cycle and is entitled to a set amount of network usage (i.e. a usage quota) during the billing cycle. For example, a user may pay $30 for a month and be entitled to 500 minutes of network time. The usage quota can be specified as a time per billing cycle amount (e.g., 500 minutes per month) or as a data volume per billing cycle amount (e.g., 1000 kB per month). In some flat rate subscription plans the usage quota is unlimited.

Another type of usage plan is an actual usage subscription plan. In an actual usage subscription plan a subscriber pays a set rate based on the actual amount of network usage during a billing cycle. For example, a user may pay $1 per minute of network usage. Actual usage plans can have incentives/penalties based on a subscriber's usage during a billing cycle. For example, in a subscription plan a subscriber may pay $1 per minute for the first 500 minutes and $2 per minute for every minute beyond 500 minutes during the billing cycle. Subscription plans can also combine aspects of flat rate plans and usage plans. For example, a subscriber may pay $30 per month for 500 minutes of network usage and $1 per minute for every minute used after 500 minutes.

In the plans described above, as well as other subscriber plans, it is useful to police a subscriber's usage against one or more quotas. Usage collection and usage analysis are required steps in policing a subscriber's network usage against one or more quotas. Usage collection involves collecting raw usage metrics from network devices. Usage collection can occur periodically throughout a billing cycle (e.g., collect data every week). Raw data is aggregated to calculate usage totals during the subscriber's billing period. Usage analysis involves evaluating a subscriber usage total against a usage quota specified by a subscription plan to determine if the usage quota was breached. If the quota is breached, the service provider applies policy enforcement according to the subscription plan. For example, the service provider may send a message to the subscriber, redirect traffic, terminate the session, and/or generate a billing record.

Usage collection generates large volumes of data and thereby places significant loads on both network devices and metering nodes. Thus, this data is expensive to collect. This data is of low value to the service provider if it does not identify a quota breach. Further, usage analysis is expensive to compute and is input/output intensive operation that does not result in identifying a quota breach in the vast majority (approximately 98% or greater) of evaluations. Typically, the rate of quota breaches is very low, because only a small percentage of subscribers (approximately less than 5%) have usage patterns which breach usage quotas during their billing period. Further, the majority of usage quotas are breached during the last few days of a subscribers billing period while evaluations occur throughout the billing cycle.

The performance of a usage analyzer is currently limited by the number of database queries executed for each accounting record processed. Typically, each usage record in a communications network results in a large number (typically 5 to 6 in many installations) of database queries, each of which is executed serially. Such database queries are not optimal since such queries often result in redundant data being queried from the database. This is particularly inefficient since the database data values are generally static, thus making the repeated querying of the same data inefficient.

Moreover, the architecture of the connectivity to the usage analyzer substantially reduces the opportunity for greater efficiencies in the overall throughput of a usage analyzer in a communications network. Specifically, there is a lack of parallelism on the input side to the usage analyzer, since all usage analyzer actions are performed in the context of the input stream's thread. On the output side, the usage analysis and the usage storage functions are separated into two different output streams, thereby preventing the use of "intelligent" decision making as to what usage data is actually written into the database.

What is needed is a method and an apparatus such that requested usage data from a subscriber database in a communication network can be obtained far more efficiently. In addition, it is desirable that more parallelism and intelligence be deployed in terms of the architecture used within that communications network.

BRIEF SUMMARY OF THE INVENTION

This invention provides a way for network operators to efficiently analyze subscriber usage in a communications network. By caching recent data entries, subsequent time-consuming database requests for the same data are replaced by the more rapid retrieval of cached entries of that data. Such an innovation in the context of subscriber usage analysis in a communications network dramatically increases the efficiency by which usage analysis can occur. In particular, redundant database requests are eliminated, and this invention capitalizes upon the generally static nature of the database data entries. Finally, to guard against the use of stale data, an embodiment of the invention provides for a configurable expiry of the cached data entries.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention is described with reference to the accompanying drawings. In the drawings, like reference numbers indicate identical or functionally similar elements. The drawing in which an element first appears is indicated by the left-most digit in the corresponding reference number.

FIG. 1 provides a diagram showing the internal architecture of a usage analyzer, in accordance with an embodiment of the current invention.

FIG. 2 provides a typical cache data design, in accordance with an embodiment of the current invention.

FIG. 3 provides a data flow illustrating the caching approach to data retrieval, in accordance with an embodiment of the current invention.

FIG. 4 illustrates a method of using a cache to support usage analysis, in accordance with an embodiment of the current invention.

FIG. 5 provides a data flow illustrating the cache expiration approach, in accordance with an embodiment of the current invention.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The performance of a traditional usage analyzer is currently limited by the number of database queries executed for each accounting record processed. A typical maximum throughput for usage records is 170 records per second on a high end computing machine (e.g. SunFire V890). A typical usage record requires five to six database queries, which by virtue of the serial nature of those queries, result in an extremely slow process. Moreover, many of the database queries executed are not optimal in the sense that these queries result in redundant data requests being made from the database. This inefficiency is particularly noticeable when the database content is predominantly static.

Figure 1:
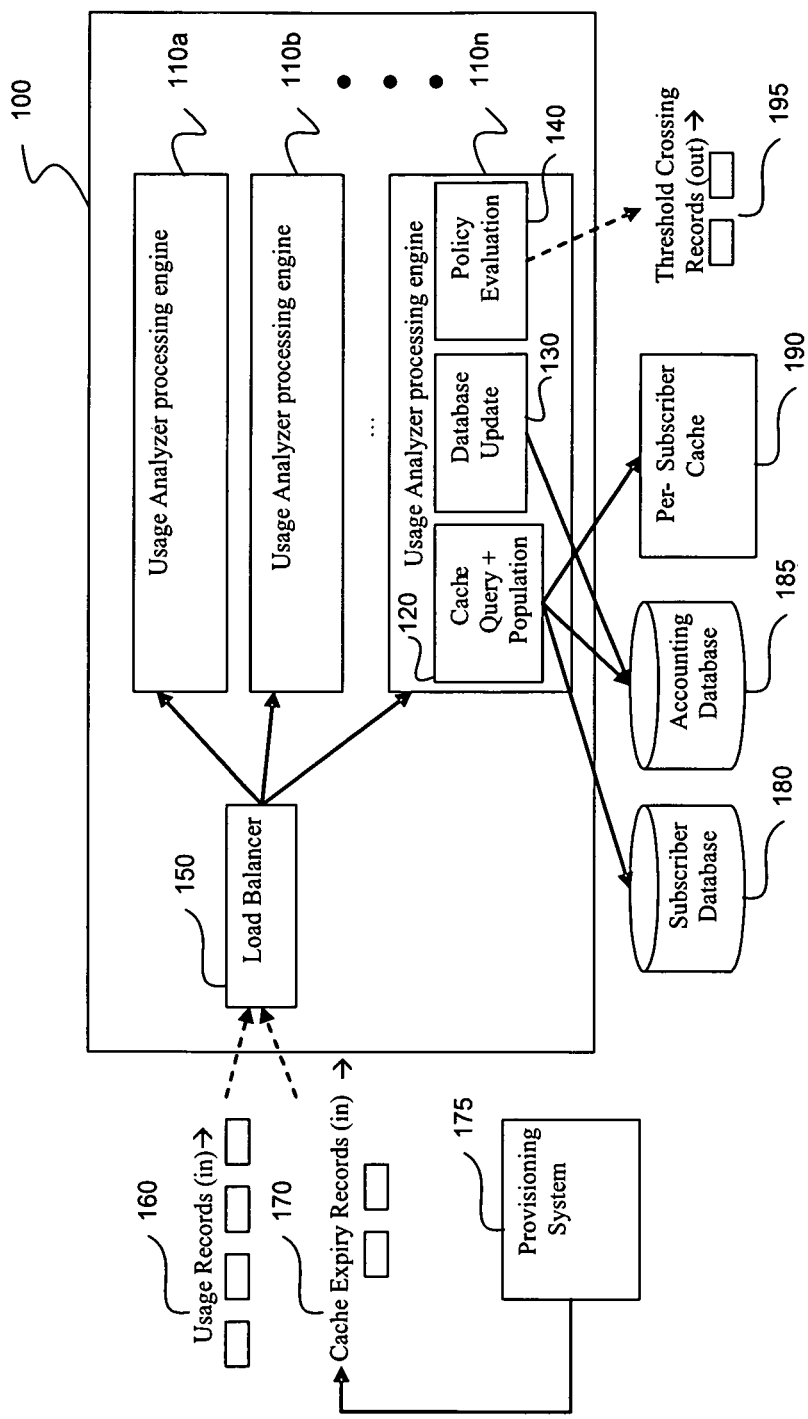

FIG. 1 illustrates usage analysis in a subscriber-based communications environment, in accordance with an embodiment of the current invention. The usage analyzer 100 contains one or more usage analyzer processing engines 110 (i.e., processors). Each usage analyzer processing engine 110 includes cache query module 120, database update module 130, and policy evaluation module 140. In a multiple usage analyzer processor engine environment, usage analyzer 100 also includes load balancer 150. In other embodiments, load balancer 150 can be located external to usage analyzer 100.

Incoming usage records 160 and incoming cache expiry records 170 are input to the usage analyzer 100. Both the incoming usage records 160 and the incoming cache expiry records 170 are received by load balancer 150, which in turn forwards these records to one of the usage analyzer processing engines 110, based on the load of the usage analyzer processing engines. Using the information contained in the incoming usage record 160, database update module 130 can update both the subscriber database 180 and the accounting database 185. The subscriber database 180 typically contains data entries, such as the identity of the subscriber, and policy information related to that subscriber, such as contracted days and times of communications network access. The accounting database 185 typically contains data entries such as the accumulated usage (e.g., minutes used, bytes used) for each subscriber in a given measurement period (e.g., a billing cycle).

Next, using the incoming usage record 160, together with the associated policy and usage information for the particular subscriber, the policy evaluation module 140 outputs threshold crossing records 195. Such threshold crossing records indicate that the particular subscriber has exceed their permitted usage during the particular time period. As noted earlier, were the policy information and usage information for a particular subscriber to be obtained by direct queries from the subscriber database and the accounting database, a relatively slow and inefficient process would result.

Figure 2:
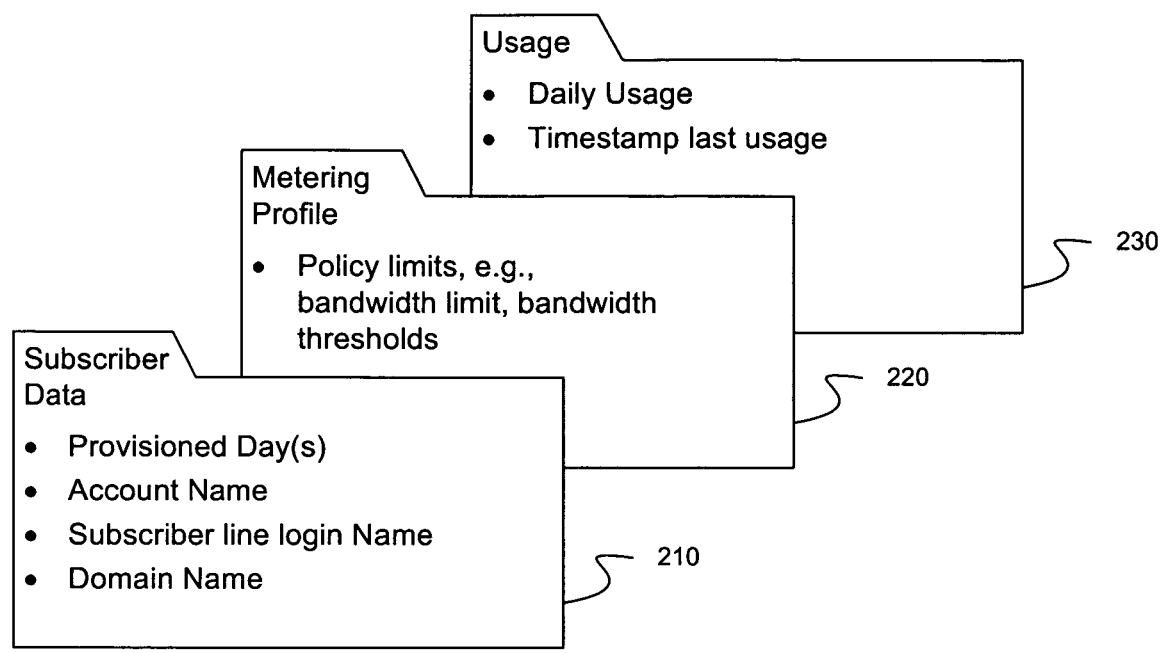

Accordingly, caching of the database tables is used to overcome the inefficiencies highlighted above, resulting in the provision of a per-subscriber cache 190, in accordance with an embodiment of the current invention. FIG. 2 illustrates a typical data design for the per-subscriber cache 190. Here, the data cached for each subscriber is partitioned into entries and sub-entries. Typical entries in a per-subscriber cache 190 are subscriber data (210), metering profile (220), and usage (230). In turn, subscriber data (210) typically includes sub-entries such as provisioned day (212), account name (214), subscriber line login name (216), and domain name (218). Metering profile (220) typically includes sub-entries such as policy limits, e.g. bandwidth limits, bandwidth thresholds for different actions, etc. Usage (230) typically includes sub-entries such as the sum of the subscriber's daily usage for the current metering month (232), and the timestamp of the last usage record processed (234). It should be stressed that these fields are used by way of a typical example only, and are not limitations on the current invention.

Figure 3:
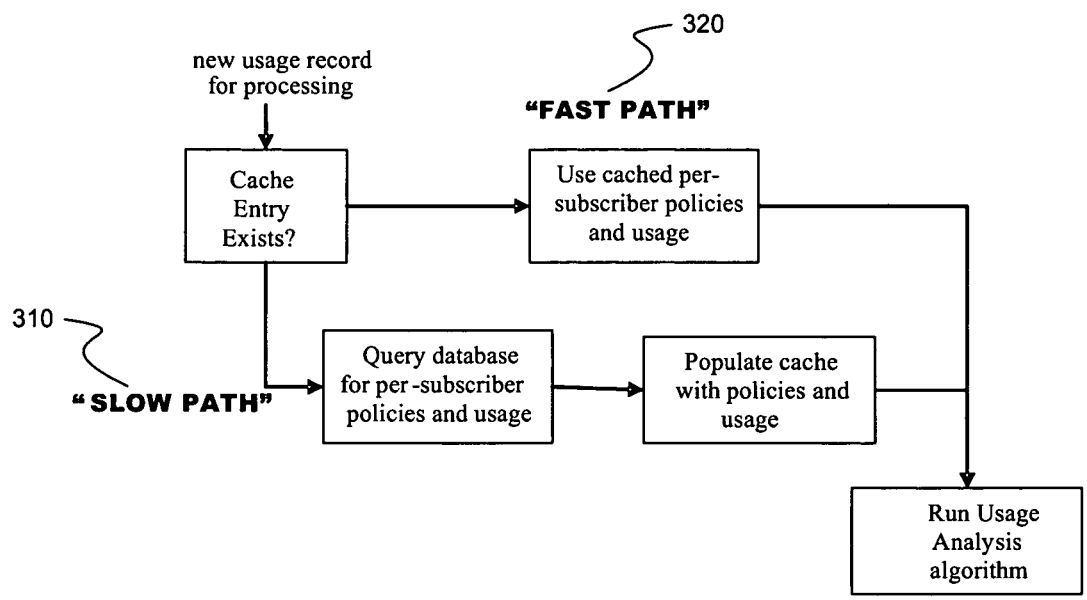

FIG. 3 illustrates the data flow 300 wherein a caching approach is adopted for data retrieval, in accordance with an embodiment of the current invention. Under this approach, the processing of an incoming usage record 160 can be separated into two processing paths, the slow path 310 and the fast path 320. In the slow path 310, the per-subscriber cache 190 does not contain all of the data needed for performing usage analysis. In this case, relatively slow database queries are therefore required in order to provide the information necessary for a subsequent usage analysis. By contrast, in the fast path 320, the per-subscriber cache 190 contains all of the data needed for performing usage analysis and thus it is used to provide the information required for subsequent usage analysis.

Figure 4:
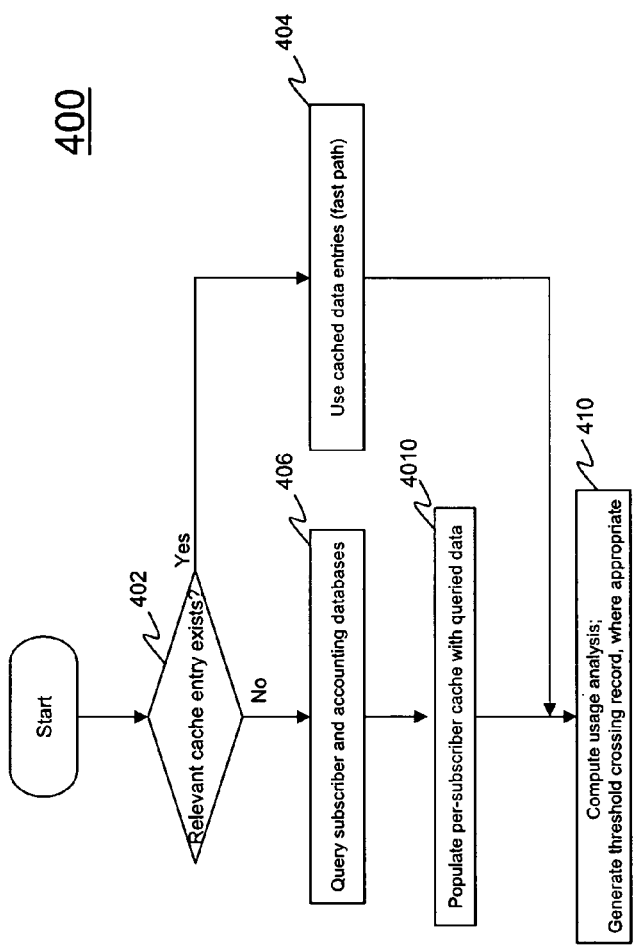

FIG. 4 provides an exemplary method 400 for the use of a subscriber cache for a usage analysis in a communications network, in accordance with an embodiment of the current invention. Method 400 begins at step 402.

At step 402, in response to an incoming usage record 160, a determination is made as to whether a relevant cache entry already exists. A prior cache entry is deemed relevant if it contains all of the information relevant for the required usage analysis. If a relevant cache entry exists, the fast path 320 is selected, and one proceeds to step 404. If a relevant cache entry does not exist, the slow path 310 is selected, and one proceeds to step 406.

At step 404, using the fast path 320, the cached data entries that capture the subscriber policies and usage are retrieved. Control is then transferred to step 410.

At step 406, using the slow path 310, the subscriber database 180 and accounting database 185 are queried for the appropriate subscriber policies and usage data entries.

At step 408, the per-subscriber cache 190 is populated with the queried database data.

Finally, at step 410, the usage analysis is computed, and threshold crossing records 195 are output, where appropriate.

In a further embodiment of the current invention, the per-subscriber cache 190 used in the usage analyzer is a "timed cache". A timed cache automatically removes cache entries after a predetermined retention period. Such an innovation removes stale entries from the per-subscriber cache 190 and provides the following benefits. Firstly, removing old cache entries serves to minimize the size of the per-subscriber cache 190 and thereby improves the speed of lookups within the per-subscriber cache 190. Secondly, subscribers can go silent. By automatically removing the cache entries after a period of time, the memory used to cache the database tables for these silent subscribers and thereby preventing unbounded memory use. Finally, although cached data may infrequently change, the data in the per-subscriber cache 190 should still be periodically reloaded to provide an upper bound on the response time to the changed data in the database.

Figure 5:
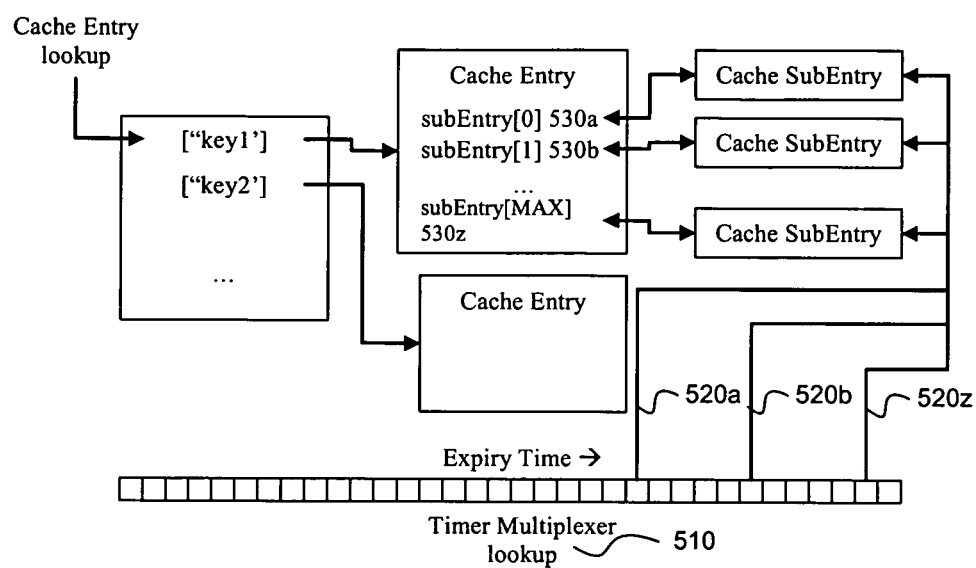

FIG. 5 illustrates a data flow 500, wherein a cache expiration approach is adopted. Here, for each data entry (or sub-entry) 530a through 530z in the per-subscriber cache 190, after a predetermined aging, a timer multiplexer 510 triggers an expiration using signals 520a through 520z that are coupled to the per-subscriber cache 190. A key consideration in the implementation of the cache expiration approach is to ensure that the cache expiration activity should be as unobtrusive as possible to ensure the cache lookups needed for usage record processing are not hindered.

Figure 6:
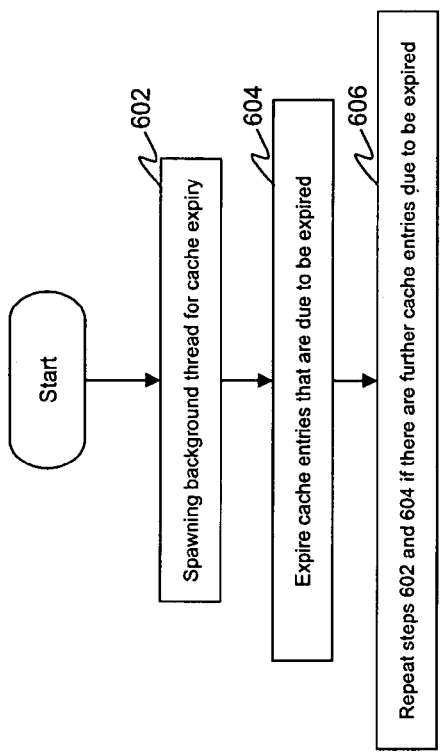
FIG. 6 illustrates a method of cache expiration, in accordance with an embodiment of the current invention.

FIG. 6 provides an exemplary method 600 for an expiration approach to a per-subscriber cache 190 in a communications network. Method 600 begins at step 602.

At step 602, a background thread for timer expiry handling is spawned.

At step 604, upon the spawning of the background thread, cache entries that are due to be expired are expired.

At step 606, should there by further timers that are waiting to be expired, then steps 602 and 604 are repeated, until there are no cache entries due to expire.

Four additional embodiments of the cached expiration approach are within the scope of the current invention. Firstly, the predetermined retention period of the cached entries in the per-subscriber cache 190 can be enhanced to become configurable by the communications network provider. Secondly, expiration of the cached entries can be done at the sub-entry level, rather than at the entry level. In the latter embodiment, if the last sub-entry has been removed from the per-subscriber cache 190, the entire cache entry is removed from the per-subscriber cache 190. Thirdly, a limit may be placed on the number of cache entries that may be expired at any one time, in order to minimize the impact on the efficiency of the usage analysis. Finally, instead of using a rigid predetermined retention period of the cached entries, the expiration time may be "jittered" around the nominal expiration time. Such an approach would be useful when a burst of usage record data had been earlier received, and which, in the more rigid embodiment, would result in a significant load on the system at the nominal expiration time. By jittering the actual expiration time around the nominal time, the system load can be reduced and throughput improved. The amount of jittering permitted is dependent upon particular system configuration conditions. A typical amount of permitted jittering may be plus or minus ten percent.

In yet another embodiment of the per-subscriber cache 190, the lazy loading approach can be adopted. In this embodiment, data will be queried from the subscriber database and accounting database, and stored in the per-subscriber cache 190 only when needed as part of the usage analysis. Similarly, when the data is automatically freed (i.e. expired) from the per-subscriber cache 190, such data is not immediately reloaded. Instead, when a usage record is received that results in a "cache miss" (i.e. when the required data for usage analysis is not available in the per-subscriber cache 190), the appropriate database will then be queried to retrieve the data that was found to be not present in the per-subscriber cache 190.

In a still further embodiment of the current invention, the possibility of usage of stale data from the cache can be addressed in the following manner. For cache data entry (or sub-entry) whose time of existence has exceeded a configurable threshold, such an entry can be refreshed at the time of its request for usage analysis. In essence, such an approach provides a "double-check" on cache data older than a certain time-frame, with such a double-check performed only at the time of its need in a usage analysis. Such an approach is useful in situations whereby a subscriber has, in real time, requested additional quota, such as when a subscriber would "top-off" their purchased quota.

In a still further embodiment of the current invention, the usage analyzer can be adapted to support hit-less switchovers between primary and backup accounting servers. In such scenarios, a single instance of the per-subscriber cache 190 is created for each instance of the accounting framework (i.e. a singleton subscriber cache). This single instance is shared by each usage analyzer output stream that is created via the accounting framework configuration file. Here, the usage analyzer supports a new configuration item called "analyze usage" which indicates whether a given usage analyzer output stream should actually perform usage analysis. Here, the single process-wide instance of the subscriber cache is shared between both "active" Usage Analyzers (i.e. configured to do usage analysis) and "backup" Usage Analyzers (i.e. configured not to do usage analysis). On the backup accounting server, processing of incoming usage records 160 still occurs. i.e. the per-subscriber cache 190 is updated and the usage is accumulated into the accounting database 185. However the usage analysis step is skipped which ensures that only the primary accounting server generates threshold crossing records 195.

Figure 7:
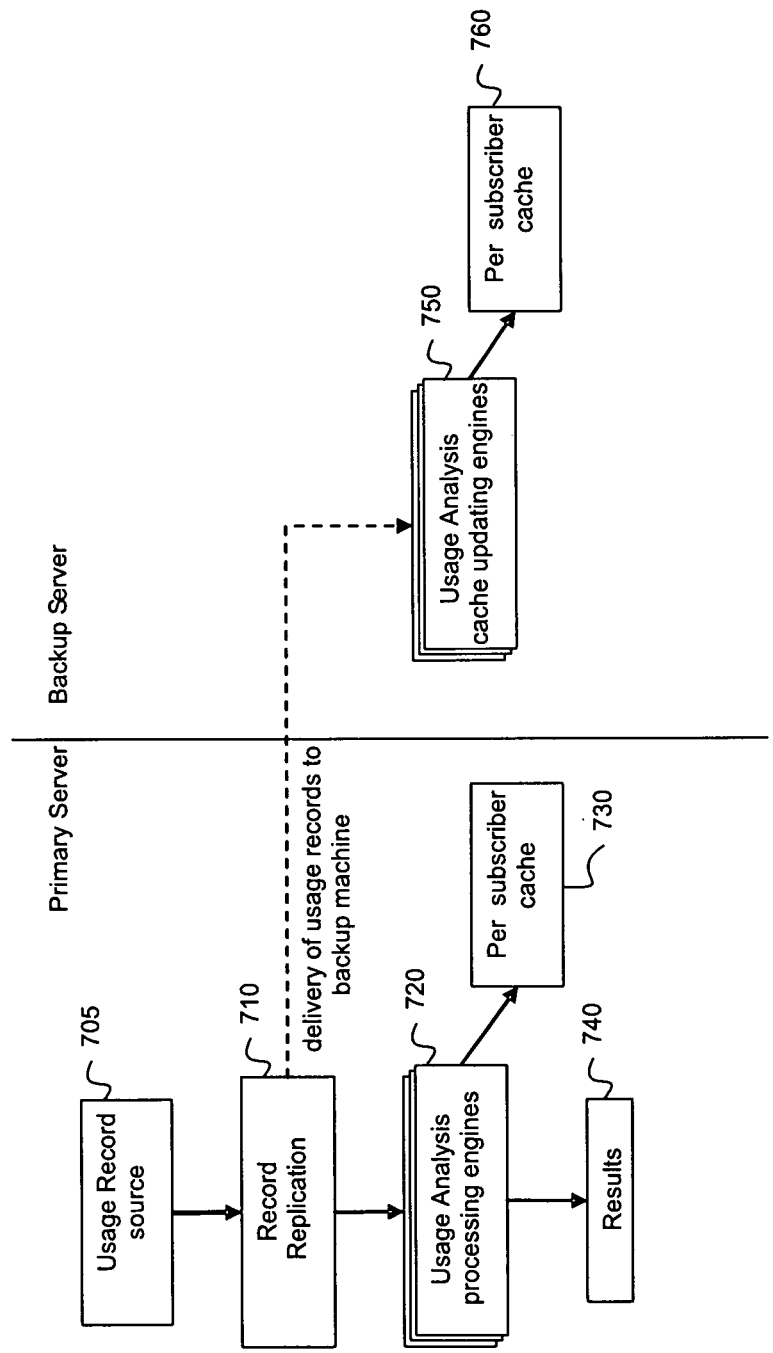
FIG. 7 illustrates an exemplary architecture of a usage analyzer that has been adapted to support hit-less switchovers, in accordance with an embodiment of the current invention.

FIG. 7 provides an exemplary architecture of a usage analyzer 700 that has been adapted to support hit-less switchovers, as described above. In the normal operating mode, incoming usage records 160 are input to the record replication module 710, which forwards the incoming usage records 160 on to the usage analyzer processing engines 720. In addition, a duplicate of the incoming usage records 160 is forwarded by the record replication module 710 to the backup usage analyzer processing engines 750. Both usage analyzer processing engines 720 and 750 interact with their own dedicated per-subscriber caches 730 and 760 respectively, as described earlier in other embodiments of the current invention. During normal operation however, while the usage analyzer processing engines 720 process the incoming usage records 160 and generate threshold crossing results 740 in the normal manner, the backup usage analyzer processing engines do not generate threshold crossing results. Rather, their efforts are confined to updating their associated per-subscriber cache 760.

Figure 8:
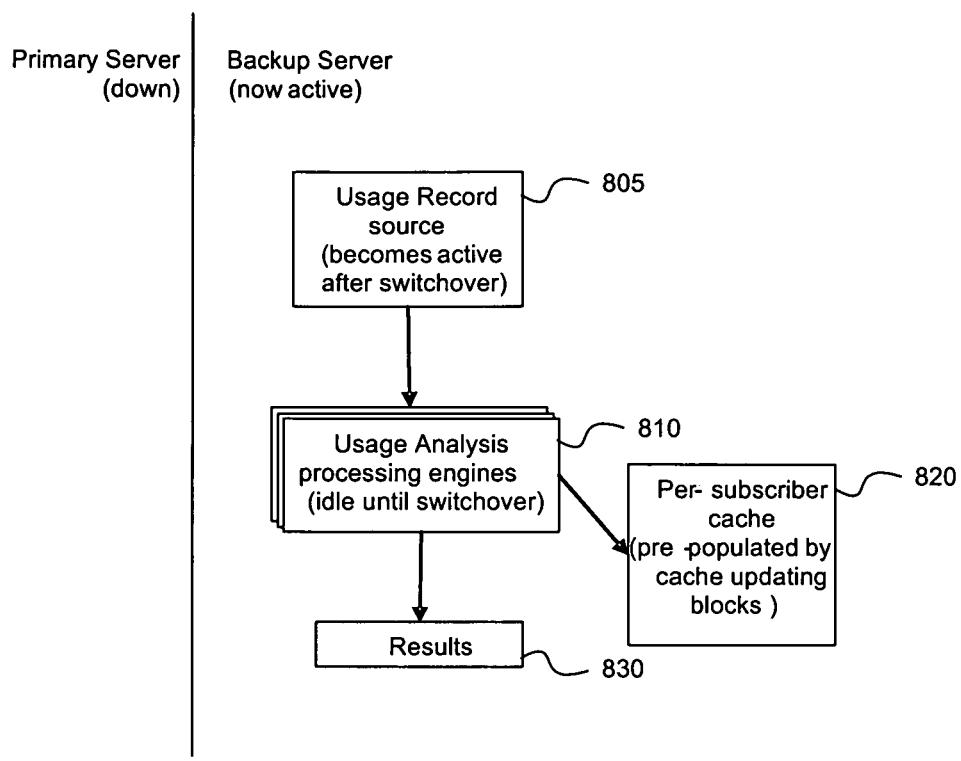
FIG. 8 illustrates the usage analyzer of FIG. 7 running in backup mode, in accordance with an embodiment of the current invention.

FIG. 8 provides an illustration of the same architecture shown in FIG. 7, but now running in backup mode. In this mode, the usage analysis processing engines 720 is no longer operational and therefore not shown. Instead, the incoming usage records 160 are diverted directly to the backup usage analysis processing engines 810. In backup mode, the backup usage analysis processing engines 810 not only interact with their associated per-subscriber cache 820 in the normal manner as described above, but also now generate threshold crossing results 830. Such a generation capability is idle during the normal operating mode.

Note that the various embodiments described are not limited to usage analysis on a per-subscriber basis. Rather, in an alternative embodiment of the current invention, usage analysis may be made on a per-account basis, whereby multiple subscribers can share a single account, or any other logical basis.

In a still further embodiment of the current invention, the functionality of the multiple usage analyzer processor engines 110 (as shown in FIG. 1) may be accomplished by a single usage analyzer processor engine. In such a case, there would be no requirement for a load balancer 150. Utilization of a single usage analyzer processor engine makes sense in small scale operations where the loading is relatively modest. However, as loading conditions escalate, multiple usage analyzer processor engines become the preferred approach.

Figure 9:
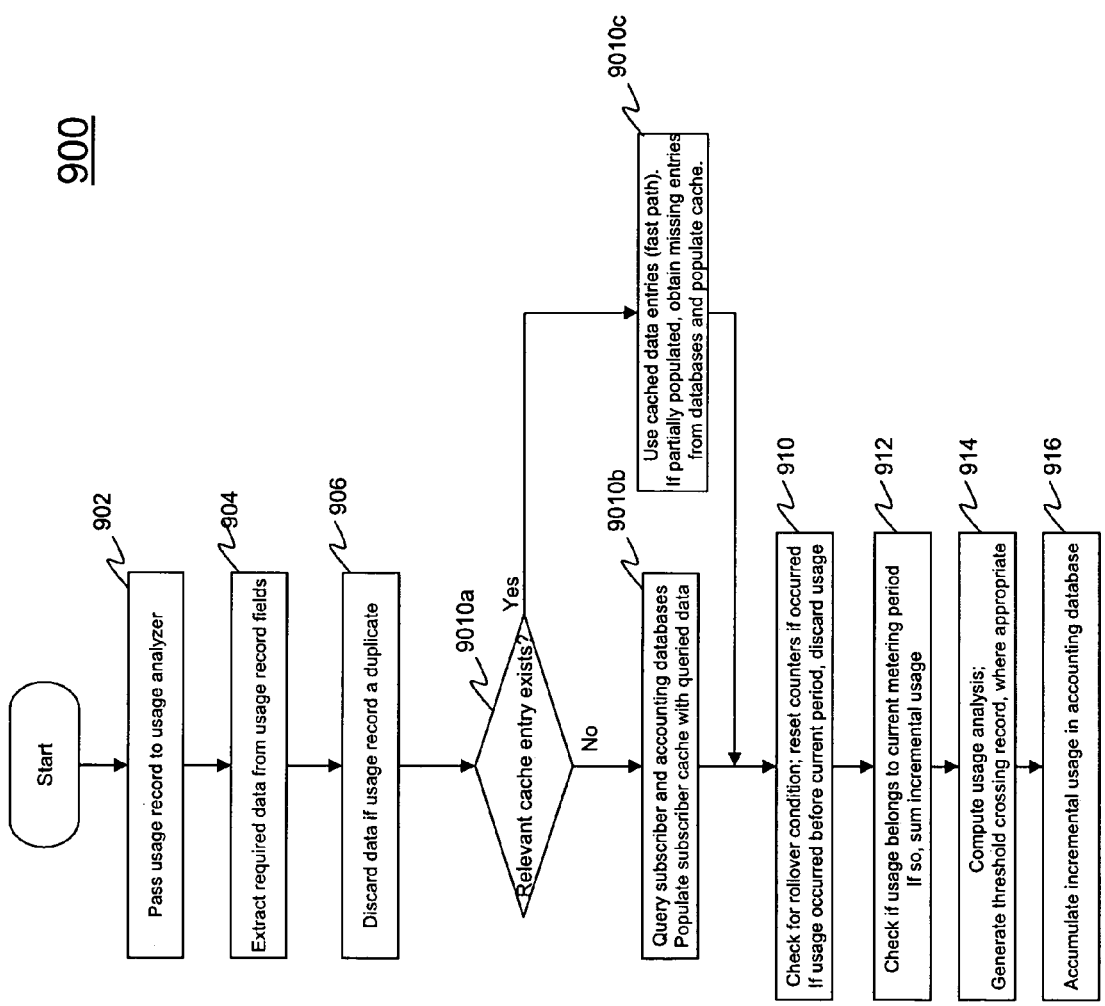
FIG. 9 illustrates a method of usage analysis in a communications environment, in accordance with an embodiment of the current invention.

FIG. 9 provides an exemplary method 900 for usage analysis in a communications network. Method 900 begins at step 902.

At step 902, the method provides for an incoming usage record 160 to be passed to the usage analyzer.

At step 904, the method provides for the required data to be extracted from the fields of the incoming usage record 160.

At step 906, the incoming usage record 160 is checked to ensure that it is not a duplicate (using the record's unique ID). If the record is a duplicate, its contents are discarded.

At step 908*a*, a lookup in the per-subscriber cache 190 is made to retrieve the relevant cache entry. If the relevant cache record is not found, then control is transferred to step 908*b*. At step 908*b*, the subscriber database 180 is queried to retrieve the required subscriber data and the metering profile. The accounting database 185 is also queried to retrieve the current metering month's usage. Next, a new cache entry is created in the per-subscriber cache 190, with the appropriate sub-entries populated and stored in the newly created cache entry. Each cache sub-entry is also scheduled for expiry according to the configured retention interval for the particular sub-entry type. Control next proceeds to step 910.

If the relevant cache record is found, control is transferred to step 908*c*. At step 908*c*, if the cache entry is fully populated, then the cached data entries are used. However, if the cache entry is only partially populated (i.e. some of the sub-entries are null because they have expired, i.e. been aged out), then the subscriber database 180 is queried to retrieve the data needed to populate the missing sub-entry usage. Each missing sub-entry is populated and stored in the appropriate entry in the per-subscriber cache 190. Each missing sub-entry is scheduled for expiry according to the configured retention interval for the sub-entry type.

At step 910, the cache entry is checked to detected a rollover condition. If the rollover condition has occurred, the usage counters in the per-subscriber cache 190 are reset to zero. If the usage occurred before the current metering period began, the usage is not summed into the cache entry. Continue to step 914.

At step 912, the usage record is checked to determine if the usage belongs in the current metering period. If so, the incremental usage from the usage record is summed with the usage stored in the cache entry.

At step 914, usage analysis is performed using the data from the per-subscriber cache 190. Note that if this particular instance of usage analyzer is configured for backup operations, then the usage analysis algorithm is computed; however no threshold crossing record 195 will be generated.

At step 916, a database update is scheduled to accumulate the incremental usage in the accounting database 185.

Computer System Implementation

Figure 10:
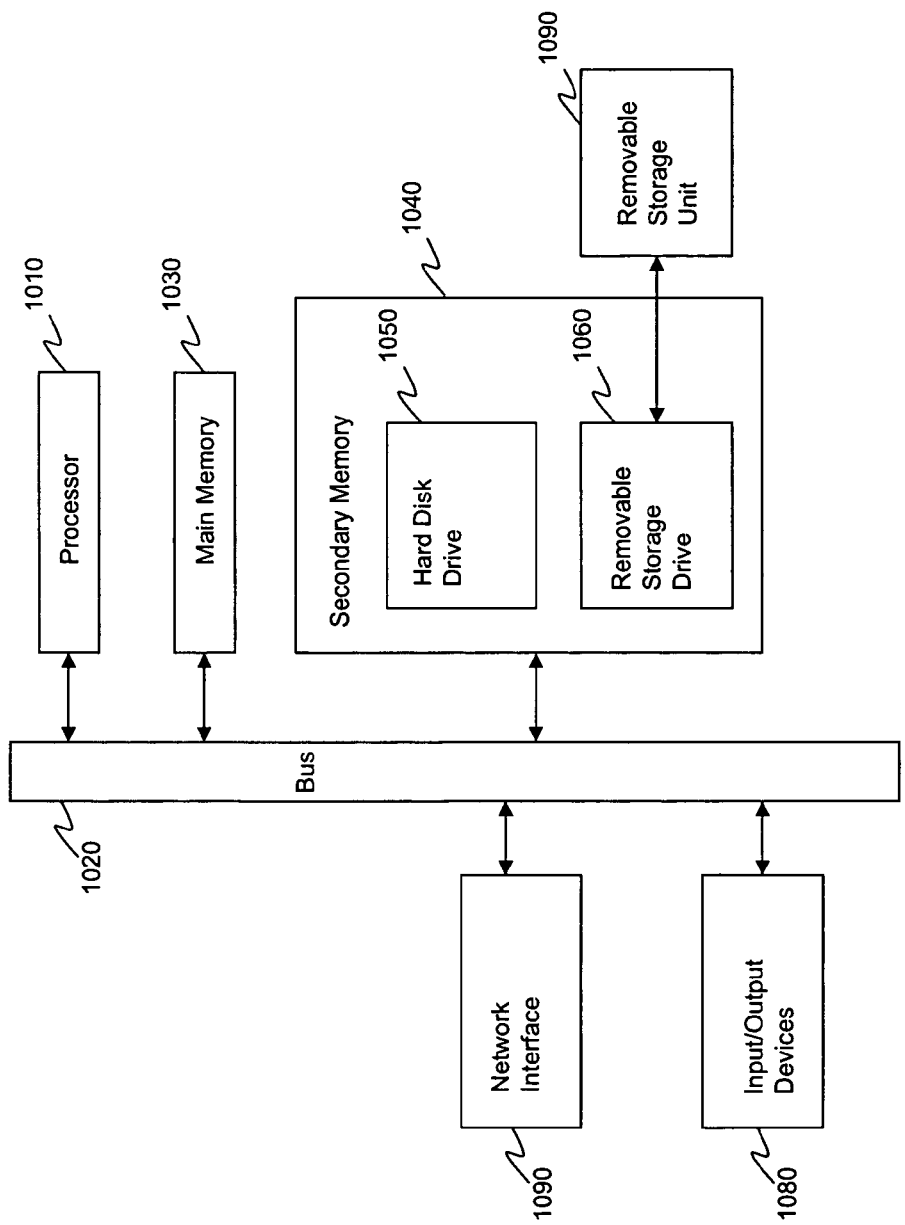
FIG. 10 is a diagram of a computer system on which the methods and systems herein described can be implemented, according to an embodiment of the current invention.

In an embodiment of the present invention, the methods and systems of the present invention described herein are implemented using well known computers, such as a computer 1000 shown in FIG. 10. The computer 1000 can be any commercially available and well known computer capable of performing the functions described herein, such as computers available from International Business Machines, Apple, Sun, HP, Dell, Cray, etc.

Computer 1000 includes one or more processors (also called central processing units, or CPUs), such as processor 1010. Processor 1010 is connected to communication bus 1020. Computer 1000 also includes a main or primary memory 1030, preferably random access memory (RAM). Primary memory 1030 has stored therein control logic (computer software), and data.

Computer 1000 may also include one or more secondary storage devices 1040. Secondary storage devices 1040 include, for example, hard disk drive 1050 and/or removable storage device or drive 1060. Removable storage drive 1060 represents a floppy disk drive, a magnetic tape drive, a compact disk drive, an optical storage device, tape backup, ZIP drive, JAZZ drive, etc.

Removable storage drive 1060 interacts with removable storage unit 1070. As will be appreciated, removable storage unit 1060 includes a computer usable or readable storage medium having stored therein computer software (control logic) and/or data. Removable storage drive 1060 reads from and/or writes to the removable storage unit 1070 in a well known manner.

Removable storage unit 1070, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 1000, or multiple computer 1000s to perform any combination of the functions described herein Computer programs (also called computer control logic) are stored in main memory 1030 and/or the secondary storage devices 1040. Such computer programs, when executed, direct computer 1000 to perform the functions of the present invention as discussed herein. In particular, the computer programs, when executed, enable processor 1010 to perform the functions of the present invention. Accordingly, such computer programs represent controllers of the computer 1000.

Computer 1000 also includes input/output/display devices 1080, such as monitors, keyboards, pointing devices, etc.

Computer 1000 further includes a communication or network interface 1090. Network interface 1090 enables computer 1000 to communicate with remote devices. For example, network interface 1090 allows computer 1000 to communicate over communication networks, such as LANs, WANs, the Internet, etc. Network interface 1090 may interface with remote sites or networks via wired or wireless connections. Computer 1000 receives data and/or computer programs via network interface 1090. The electrical/magnetic signals having contained therein data and/or computer programs received or transmitted by the computer 1000 via interface 1090 also represent computer program product(s).

The invention can work with software, hardware, and operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

The invention can work with software, hardware, and operating system implementations other than those described herein. Any software, hardware, and operating system implementations suitable for performing the functions described herein can be used.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A usage analysis apparatus, comprising:
    a cache; and
    a processor engine coupled to the cache, and responsive to an input of a usage record associated with a subscriber in a communications network, the processing engine including a cache query module, a database update module and a policy evaluation module, wherein the policy evaluation module is configured to output one or more threshold crossing records based on the subscriber exceeding a permitted usage, wherein the database update module is configured to update a database, and
    wherein the cache query module retrieves a data item from the cache if the cache query module determines that the cache contains the data item for analysis of the usage record, otherwise the cache query module retrieves the data item from the database and populates the cache with the data item;
    wherein the cache query module further deletes the data item in the cache in response to an input of an expiry input;
    wherein the expiry input is generated based on an age of the data item in the cache;
    wherein the generation of the expiry input can be jittered in a range centered on a nominal age.

2. The apparatus of claim 1, wherein the age is configurable.

3. The apparatus of claim 1, wherein the range is plus or minus ten percent.

4. The apparatus of claim 1, wherein the expiry input originates from a background thread.

5. The apparatus of claim 1, wherein the data item is retrieved from the cache if, in addition, an age of the data item in the cache is less than a threshold.

6. The apparatus of claim 1, wherein the analysis of the usage record is selected from the group consisting of per-subscriber analysis and per-account analysis.

7. The apparatus of claim 1, further comprising
    a plurality of processor engines coupled to the cache; and
    a load balancer that distributes usage records for processing among the processor engines based on the respective loads of the processor engines.

8. A usage analysis method, comprising:
    allocating memory for a cache, the cache being coupled to a processing engine that includes a cache query module, a database update module and a policy evaluation module, wherein the database update module is configured to update a database;
    in response to an input of a usage record associated with a subscriber in a communications network, determining, by the cache query module, if the cache contains a data item needed for analysis of the usage record;
    retrieving, by the cache query module, the data item from the cache if the cache is determined to contain the data item, otherwise from the database;
    populating, by the cache query module, the cache with the data item if said retrieving uses the database;
    outputting, by the policy evaluation module, threshold crossing records if the subscriber exceeds a permitted usage; and
    in response to an expiry input associated with the data item, deleting the data item from the cache;
    wherein the expiry input is generated based on an age of the data item in the cache;

wherein the generation of the expiry input can be jittered in a range centered on a nominal age.

9. The method of claim 8, wherein the age is configurable.

10. The method of claim 8, wherein the range is plus or minus ten percent.

11. The method of claim 8, wherein the expiry input originates from a background thread.

12. The method of claim 8, wherein the retrieving of the data item from the cache occurs if, in addition, an age of the data item in the cache is less than a threshold.

13. The method of claim 8, wherein the analysis of the usage record is selected from the group consisting of per-subscriber analysis and per-account analysis.

14. A computer-readable medium containing instructions for controlling at least one processor by a method, the method comprising:
   allocating memory for a cache, the cache being coupled to a processing engine that includes a cache query module, a database update module and a policy evaluation module, wherein the database update module is configured to update a database;
   in response to an input of a usage record associated with a subscriber in a communications network, determining, by the cache query module, if the cache contains a data item needed for analysis of the usage record;
   retrieving, by the cache query module, the data item from the cache if the cache is determined to contain the data item, otherwise from the database;
   populating, by the cache query module, the cache with the data item if said retrieving uses the database;
   outputting, by the policy evaluation module, threshold crossing records if the subscriber exceeds a permitted usage; and
   in response to an expiry input associated with the data item, deleting the data item from the cache;
   wherein the expiry input is generated based on an age of the data item in the cache;
   wherein the generation of the expiry input can be jittered in a range centered on a nominal age.

* * * * *